United States Patent
Massand

(10) Patent No.: US 10,157,185 B2
(45) Date of Patent: Dec. 18, 2018

(54) SYSTEMS AND METHODS FOR THE COMPARISON OF ANNOTATIONS WITHIN FILES

(71) Applicant: LITERA CORPORATION, McLeansville, NC (US)

(72) Inventor: Deepak Massand, McLeansville, NC (US)

(73) Assignee: LITERA CORPORATION, Chicago, IL (US)

( * ) Notice: Subject to any disclaimer, the term of this patent is extended or adjusted under 35 U.S.C. 154(b) by 0 days.

(21) Appl. No.: 14/248,514

(22) Filed: Apr. 9, 2014

(65) Prior Publication Data
US 2014/0222853 A1 Aug. 7, 2014

Related U.S. Application Data

(63) Continuation of application No. 13/022,075, filed on Feb. 7, 2011, now Pat. No. 8,732,181.

(60) Provisional application No. 61/410,152, filed on Nov. 4, 2010.

(51) Int. Cl.
G06F 17/30 (2006.01)
G06F 7/00 (2006.01)
G06F 17/24 (2006.01)

(52) U.S. Cl.
CPC .......... *G06F 17/301* (2013.01); *G06F 17/241* (2013.01); *G06F 17/30864* (2013.01)

(58) Field of Classification Search
CPC ............. G06F 17/241; G06F 17/30864; G07F 17/3293
USPC ......................................................... 707/758
See application file for complete search history.

(56) References Cited

U.S. PATENT DOCUMENTS

| | | | |
|---|---|---|---|
| 5,253,362 A | 10/1993 | Nolan et al. | |
| 6,332,144 B1 | 12/2001 | deVries et al. | |
| 6,572,661 B1 * | 6/2003 | Stern ............................ | 715/203 |
| 6,785,676 B2 | 8/2004 | Oblinger | |
| 7,054,812 B2 | 5/2006 | Charlesworth et al. | |
| 7,356,563 B1 * | 4/2008 | Leichtling .............. | G06Q 10/06 345/2.1 |
| 7,493,559 B1 * | 2/2009 | Wolff .................... | G06F 17/241 715/727 |

(Continued)

OTHER PUBLICATIONS

Petition Under 37 C.F.R. § 1.78(B) to Accept Unintentionally Delayed Benefit Claim and Submission of Supplemental Application Data Sheet Supplemental Application Data Sheet.

(Continued)

*Primary Examiner* — Pavan Mamillapalli
(74) *Attorney, Agent, or Firm* — Finnegan, Henderson, Farabow, Garrett & Dunner LLP

(57) ABSTRACT

Systems and methods are disclosed for comparing annotations in files to show changes in the annotations at a granular level. In one implementation, a system receives a first file and a second file for comparison. The system determines the annotation ranges for each annotation in the first file and the annotation range for each annotation in the second file. The system then determines the annotations from the first file that overlap with annotations from the second file and compares annotations that overlap. The system then incorporates the comparison of the annotations into a main comparison file. In certain implementations, the system uses an index to determine what annotations overlap. In other implementations, matched pairs are created from overlapping annotations.

19 Claims, 8 Drawing Sheets

(56) References Cited

U.S. PATENT DOCUMENTS

| | | | |
|---|---|---|---|
| 7,499,956 B1* | 3/2009 | Darcy et al. | 707/999.001 |
| 7,565,364 B1* | 7/2009 | Darcy | G06F 8/30 |
| 7,574,048 B2* | 8/2009 | Shilman | G06F 3/04883 |
| | | | 345/156 |
| 7,779,347 B2* | 8/2010 | Christiansen | G06F 17/241 |
| | | | 715/230 |
| 8,005,850 B2* | 8/2011 | Walther | G06F 17/30696 |
| | | | 707/758 |
| 8,024,802 B1 | 9/2011 | Preston | |
| 8,190,990 B2* | 5/2012 | Le | G06F 17/30882 |
| | | | 715/230 |
| 9,323,733 B1* | 4/2016 | McGhee | G06F 21/60 |
| 2002/0022960 A1 | 2/2002 | Charlesworth et al. | |
| 2002/0105532 A1 | 8/2002 | Oblinger | |
| 2003/0117379 A1* | 6/2003 | Carro | G06F 3/04883 |
| | | | 345/173 |
| 2004/0267798 A1* | 12/2004 | Chatterjee | G06F 17/241 |
| | | | 707/999.102 |
| 2005/0138541 A1* | 6/2005 | Euchner | G06F 17/241 |
| | | | 715/205 |
| 2006/0291727 A1* | 12/2006 | Bargeron | G06Q 10/10 |
| | | | 382/218 |
| 2008/0292213 A1 | 11/2008 | Chau | |
| 2010/0189318 A1* | 7/2010 | Chang | F23Q 3/004 |
| | | | 382/128 |
| 2012/0060082 A1 | 3/2012 | Edala | |

* cited by examiner

Item 5. Selected Financial Data

510 [The following financial data, reflects our financial position and results of operations for each of the five fiscal years in the period ended December 20, 2006,] set forth below, has been derived from, should be read in conjunction with and is qualified in its entirety by reference to, our consolidated financial statements and notes thereto. The data presented below should be read in conjunction with ITEM 7, "Management's Discussion and Analysis of Financial Condition and Results of Operation" and Item 8, "Financial statements and Supplementary Data."

515

Comment [1]: This fragment must be revised.

Item 6. Selected Financial Data

617 — [The following selected financial data, with respect to our financial position and results of operations for each of the five fiscal years in the period ended December [20], 2006,] set forth below, has been derived from, should be read in conjunction with and is qualified in its entirety by reference to, our consolidated financial statements and notes thereto. The selected financial data [presented 622 below (in MS-EXCEL) should] also be read in conjunction with ITEM 8, "Management's Discussion and Analysis of Financial Condition and Results of Operation" and Item 9, "Financial statements and Supplementary Data."

618

623

605

625 — Comment [3]: Shouldn't this be 31?

627  615
628

Comment [1]: This fragment was revised.

620

Comment [2]: The EXCEL table was added.

FIG. 6

| First Word Index | Second Word Index |
|---|---|
| 1 | 1 |
| 2 | 2 |
|  | 3 |
| 3 | 4 |
|  | 5 |
| 4 | 6 |
| 5 | 7 |
|  | 8 |
| 6 | 9 |
| 7 | 10 |
| 8 | 11 |
| 9 | 12 |
| 10 | 13 |
| 11 | 14 |
| 12 | 15 |
| 13 | 16 |
| 14 | 17 |
| 15 | 18 |
| 16 | 19 |
| 17 | 20 |
| 18 | 21 |
| 19 | 22 |
| 20 | 23 |
| 21 | 24 |
| 22 | 25 |
| 23 | 26 |
| 24 | 27 |
| 25 | 28 |
| 26 | 29 |
| 27 | 30 |

The following financial data, reflects our financial
    1     2        3     4      5      6     7
position and results of operations for each of the five fiscal
  8      9   10    11     12    13   14   15 16 17   18
years in the period ended December 20, 2006, set...
 19  20 21   22    23    24     25  26  27

The following selected financial data, with respect to
  1     2       3      4      5      6    7    8
our financial position and results of operations for each of
 9     10    11     12  13 14    15     16  17  18
the five fiscal years in the period ended December 20,
19 20  21   22  23 24  25   26    27     28
2006, set...
29  30

Item 56. Selected Financial Data

[The following selected financial data, reflects with respect to our financial position and results of operations for each of the five fiscal years in the period ended December [20], 2006,] set forth below, has been derived from, should be read in conjunction with and is qualified in its entirety by reference to, our consolidated financial statements and notes thereto. The selected financial data [presented below (in MS-EXCEL) should] also be read in conjunction with ITEM 78, "Management's Discussion and Analysis of Financial Condition and Results of Operation" and Item 89, "Financial statements and Supplementary Data."

Comment [3]: Shouldn't this be 31? — 1025

Comment [1]: This fragment must bewas revised. — 1015

Comment [2]: The EXCEL table was added. — 1020

SYSTEMS AND METHODS FOR THE COMPARISON OF ANNOTATIONS WITHIN FILES

RELATED APPLICATIONS

This is a continuation of U.S. application Ser. No. 13/022,075, filed Feb. 7, 2011, which claims priority from U.S. Provisional Application Ser. No. 61/410,152, filed Nov. 4, 2010, all of which are incorporated herein by reference.

TECHNICAL FIELD

This disclosure generally relates to the comparison of annotations within multiple files and more particularly, to methods and systems for the granular comparison of annotations within multiple files.

BACKGROUND

The need to manage and mitigate risks in documents, including changes made to document versions by internal and external sources, has become an essential component of a number of business specialties involved with documents that may be sensitive in nature, such as those found in the legal, financial, government, and accounting business sectors. Professionals in industries that consistently engage in document sharing and collaboration within and outside of their organizations find document comparison programs essential in ensuring identification of all changes made throughout a documents lifecycle and all sensitive metadata held within their documents.

Multiple users may edit documents in a number of programs making changes to text, tables, images, and other embedded objects such as values, formulas, annotations and other document aspects. Reviewing a document after it has been shared with an external source, whether by humans or by computer programs, becomes necessary to accurately identify changes in the document content.

Conventional document comparison programs, such as Workshare™ Professional or Deltaview, SoftInterface® Diff Doc™, DocsCorp compareDocs, and Esquire Innovations iRedline, compare differences between two documents (e.g., word processing documents, spreadsheet documents, presentation documents, etc.), a task formerly reserved solely for humans. These programs identify and ascertain differences in an original (first) and modified (second) document and display those differences in a third document, commonly referred to as a redline document.

These conventional document comparison programs fail to adequately preserve the context of changes in annotations (comments) between original and modified documents. Specifically, the programs fail to clearly present changes in annotations at a granular level. Annotation text is often stored in a different location than the text of the main document. Markers are placed in the document so that the location of the annotation and its text can be determined. But because the annotation text is not part of the main document, many document comparison programs ignore the annotation text or only show changes to this text as a new comment inserted or deleted without showing the actual granular changes. For example, when a change is made to the content of an annotation in an original file, this annotation is shown unchanged and the modification is shown as a whole new insertion of a comment in a modified file. Other document comparison programs insert the text of the annotation into the body of the main document at the location of the annotation marker before performing a comparison. However, this results in a document that is difficult to read.

In either case, the reader loses the context of the changes. Either the entirety of the comment is shown as changed, defeating the purpose of a comparison because a human must still review the two comments to determine what actually changed, or the comment text gets mixed up with the document text, making it difficult to discriminate between the text and the comments. Thus, with current systems the context of the change is lost, limiting the user's ability to quickly decipher contextually relevant changes to the document.

SUMMARY

Disclosed embodiments provide computer-based file comparison systems and methods that allow comparison of annotations within files at a granular level to preserve context. Consistent with disclosed embodiments, a system is provided for comparing annotations in files. In one aspect, the system includes a processor and a memory. The memory may include instructions that cause the processor to receive a first file and a second file for comparison. The memory may further include instructions that cause the processor to determine an annotation range for a first annotation in the first file and an annotation range for a second annotation in the second file. The memory may further include instructions that cause the processor to determine that the first annotation range and the second annotation range overlap and to compare the first annotation and the second annotation, creating an annotation comparison output.

Consistent with disclosed embodiments, a method is provided for comparing annotations in files. In one aspect, the method includes receiving a first file and a second file for comparison. The method may further include determining an annotation range for a first annotation in the first file and an annotation range for a second annotation in the second file. The method may further determine that the first annotation range and the second annotation range overlap and compare the first annotation and the second annotation, creating an annotation comparison output. The method may also include comparing the first file and the second file to create a file comparison output and incorporating the annotation comparison output into the file comparison output.

Consistent with other disclosed embodiments, tangible computer-readable storage media may store program instructions that are executable by a processor to implement any of the methods disclosed herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and together with the description, serve to explain the disclosed principles. In the drawings:

FIG. 5 is an example of an original file with an annotation;

FIG. 6 is an example of a modified file with annotations;

FIG. 7 is an exemplary partial word index for the original file, consistent with disclosed embodiments;

FIG. 8 is an exemplary partial word index for the modified file, consistent with disclosed embodiments;

FIG. 9 is an exemplary partial word index matrix for the original file and the modified file, consistent with disclosed embodiments; and FIG. 10 is an example of a comparison output showing the differences between the original file and the modified file, consistent with disclosed embodiments.

DESCRIPTION OF THE EMBODIMENTS

Disclosed embodiments may enable annotations, also referred to as comments, in a first file and a second file to be compared at a granular level, making changes to specific words in the text of a comment apparent. In one aspect, the comparisons may be displayed such that users can easily discern changes in the comments as well as the main body of the two files. Reference will now be made in detail to exemplary embodiments, examples of which are illustrated in the accompanying drawings. Wherever convenient, the same reference numbers will be used throughout the drawings to refer to the same or like parts.

Figure 1:
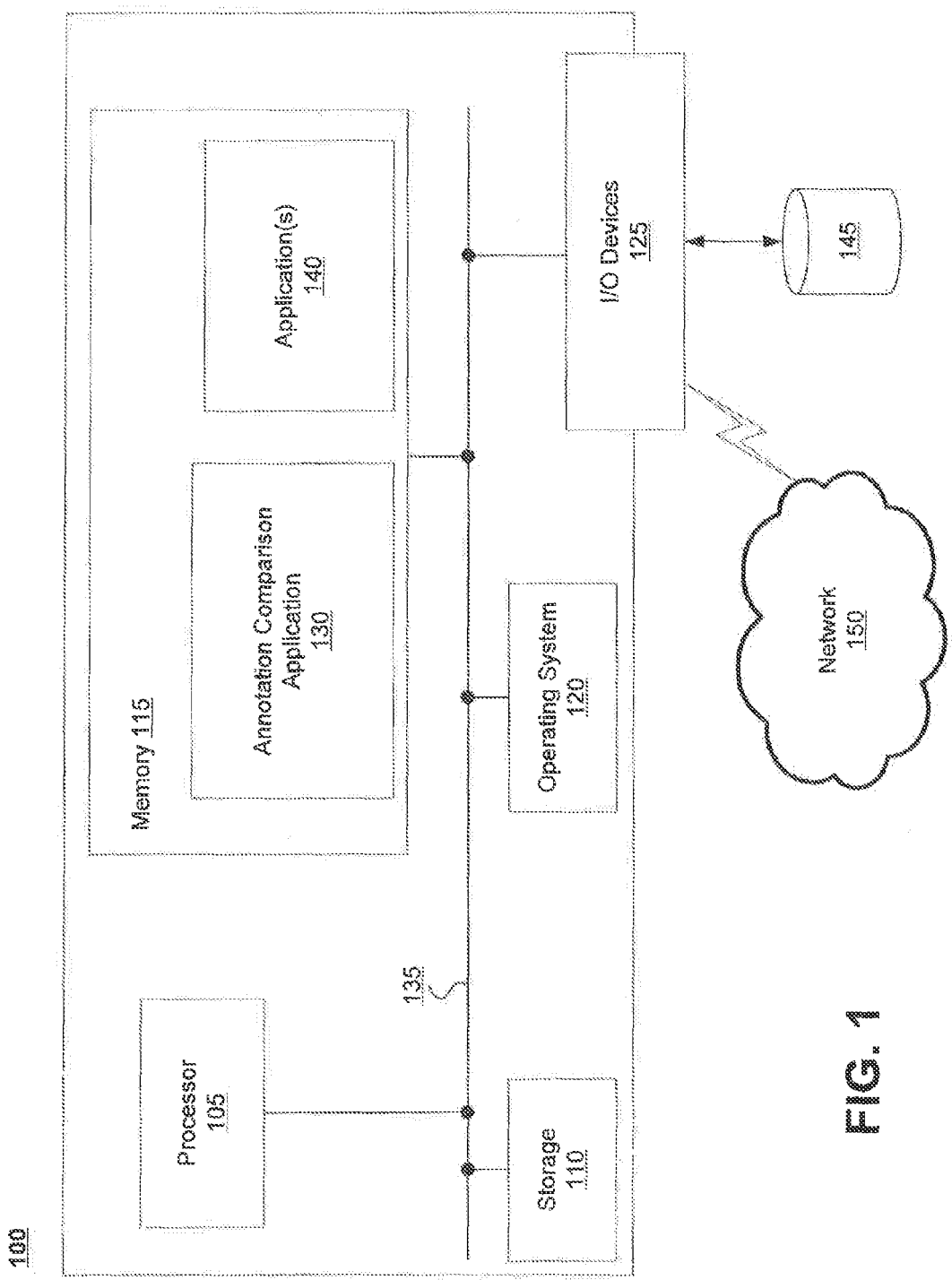
FIG. 1 is a diagram of exemplary system components that may be used to implement disclosed embodiments.

FIG. 1 is a diagram of exemplary system components that may be used to implement one or more disclosed embodiments. The components and arrangement, however, may vary. In accordance with certain disclosed embodiments, an annotation comparison application 130 may run on a computer system 100. Computer system 100 may include a number of components, such as a processor 105, nonvolatile storage 110, memory 115, operating system 120, input/output (I/O) devices 125, and bus 135. Annotation comparison application 130 may be a stand-alone application or may be incorporated into one or more other applications 140. Annotation comparison application 130 may reside in memory 115, and may be loaded from storage 110 or from other external tangible storage medium (not shown) through I/O devices 125. Instructions in annotation comparison application 130 may be executed by one or more processors, such as processor 105, to perform features consistent with one or more disclosed embodiments.

Computer system 100 may be a general purpose or notebook computer, a mobile device with computing ability, a server, a mainframe computer, or any combination of these computers and/or affiliated components. Computer system 100 may communicate with network 150 through I/O devices 125. For example, computer system 100 may establish a communication link with network 150, such as through a LAN, a WAN, or other suitable connection that enables computer system 100 to send and receive information, as described herein. Computer system 100 may be a standalone system or may be part of a subsystem, which may, in turn, be part of a larger system, such as a networked desktop emulator. Computer system 100 may be accessible to a user locally, or may be available to a user over the internet.

Processor 105 may be one or more known or later created processing devices, such as a microprocessor from the Pentium™ family manufactured by Intel™ or the Turion™ family manufactured by AMD™. Memory 115 may be one or more storage devices configured to store information used by processor 105 to perform certain functions related to disclosed embodiments. Storage 110 may be a volatile or non-volatile, magnetic, semiconductor, tape, optical, removable, nonremovable, or other type of storage device or tangible computer-readable medium.

In one embodiment, memory 115 may include annotation comparison application 130 that, when executed by a processor, such as processor 105, may enable the comparison of annotations in two or more files. Annotation comparison application 130 may be part of an application that compares files, or may be run as a sub program (child application) of applications 140, which may provide for editing or viewing of files. Memory 115 may also include an integrative support program that links the other programs and allows them to use a common database, provides a common user interface, performs basic bookkeeping tasks, (such as storing the user's input, etc.), and provides user guidance and help. Memory 115 may also include other programs that perform other functions and processes, such as programs that provide communication support, Internet access, etc.

Methods, systems, and articles of manufacture consistent with disclosed embodiments are not limited to separate programs or computers configured to perform dedicated tasks. For example, memory 115 may be configured with annotation comparison application 130, which performs one or more functions when executed by processor 105. Alternatively, memory 115 may include multiple programs that collectively perform one or more functions of annotation comparison application 130. Moreover, processor 105 may execute one or more programs located remotely from system 100. For example, system 100 may access one or more remote programs that, when executed, perform functions related to disclosed embodiments or provide files for comparison to system 100.

Memory 115 may be also be configured with operating system 120 that performs known operating system functions when executed by system 100. By way of example, operating system 120 may include Microsoft Windows™, Unix™, Linux™, Apple™ Computers type operating systems, Personal Digital Assistant (PDA) type operating systems, such as Microsoft CE™, or other types of operating systems. Accordingly, embodiments of the disclosed invention will operate and function with computer systems running any type of operating system.

I/O devices 125 may comprise one or more input devices and one or more output devices that allow data to be received and/or transmitted by system 100. For example, I/O devices 125 may include one or more input devices, such as a keyboard, touch screen, mouse, and the like, that enable system 100 to receive data from a user, such as selection of two files for comparison. Further, system 100 may include I/O devices 125 that communicate with one or more output devices, such as a display screen, CRT monitor, LCD monitor, plasma display, printer, and speaker devices, that enable system 100 to present data to a user, such as a comparison output file, I/O devices 125 may also include one or more digital and/or analog communication input/output devices that allow system 100 to communicate with other machines and devices, including other machines and devices connected to network 150. The configuration and number of input and/or output devices incorporated in I/O devices 125 may vary as appropriate for certain embodiments.

Computer system 100 may also be communicatively connected to one or more databases 145 locally or through network 150. The databases may store information and may be accessed and/or managed through system 100. By way of example, the databases may be document management systems, Microsoft SQL databases, SharePoint databases, Oracle™ databases, Sybase™ databases, or other relational databases. The databases may include, for example, data and information related to a particular file to be compared or to settings used by annotation comparison application 130. Systems and methods of disclosed embodiments, however, are not limited to separate databases or even to the use of a database.

Figure 2:
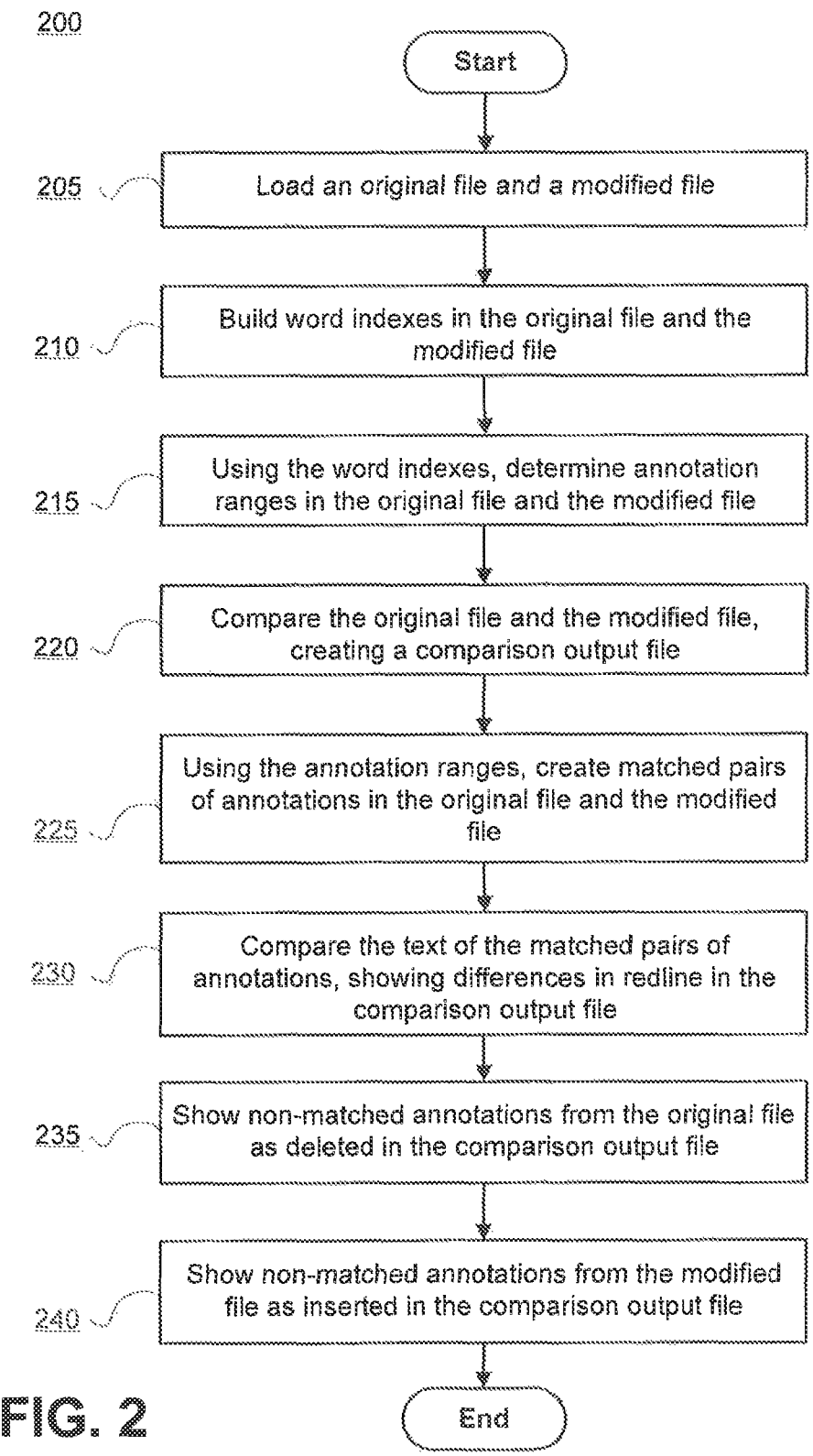
FIG. 2 is a flow diagram illustrating an exemplary annotation comparison process, consistent with disclosed embodiments.

FIG. 2 is a flow diagram illustrating an exemplary annotation comparison process 200, consistent with disclosed embodiments. In certain embodiments, process 200 may be performed by annotation comparison application 130 when executed by a processor. Process 200 may be used to compare annotations at a granular level, rather than showing annotations as inserted and deleted. In Step 205, annotation comparison application 130 may receive an original file and a modified file. A file may be a document, a spreadsheet, a text file, an image, a database, a temporary buffer, or any other type of file used to store information. A modified file may be a version of the original file that has been modified by the user, another person, or an automated process. The files may be located on system 100, on a system accessible to system 100 over network 150, or a combination of these. In Step 210, annotation comparison application 130 may build word indexes for the original file and the modified file. A word index may include a representation assigned to each word in the file. In some embodiments, the index may be associated with other data such as pixels, rows, columns, or coordinates, not just words.

For example, an index may include a number, an alphanumeric code, or any other type of representation. In certain embodiments, the words in the original file and the modified file may be assigned a number sequentially, starting with a word index of one (1) for the first word in the file. For example, if the original file contains the text "The quick brown fox jumped over the log" the original file may have a word index that appears as "The (1) quick (2) brown (3) fox (4) jumped (5) over (6) the (7) log (8)." In other embodiments, words in a paragraph may be assigned a number sequentially, starting with a word index of one (1) for the first word of the paragraph. In such embodiments, the word index may include a paragraph identifier in addition to the position indicator, so that each word in the file is identified by its paragraph and the position within the paragraph. For example, words in the fourth paragraph of the original file may be assigned word indexes of 4.1, 4.2, 4.3, etc. In addition to paragraphs, other logical portions of a file may be used, such as cells, rows, columns, tables, pages, or sections. Other forms of representation may also be implemented without departing from the scope of the disclosed embodiments. For example, string characters may be used (e.g., A, B, C), alpha-numeric text (e.g., A.1, A.2, B.1, etc.) or combinations of these representations. Aspects of the disclosed embodiments may use any form of representation to reflect the word indexes or other type of index.

In Step 215, annotation comparison application 130 may use the word indexes to determine an annotation range for each annotation in the original file and each annotation in the modified file. When creating an annotation, a user may select several words in the body of a file for association with the annotation. Upon creation of an annotation, the annotation may be given a tag with a unique annotation identifier. The annotation identifier may point to the location of the annotation text. The annotation text may be kept in a text frame, and the text frame may be located before the paragraph, cell, image, or other object with which the annotation is associated. The starting location of an annotation may be marked using a hidden character at the insertion point of the annotation. Another hidden character may mark the end of the annotation, with the words in between the two hidden characters being associated with the annotation. In some embodiments, the annotation range may be based on other data associated with the annotation, such as pixels, rows, columns, coordinates, etc.

In one embodiment, by analyzing the word index following the hidden character at the insertion point of an annotation and the word index preceding the hidden character at the end of the annotation, annotation comparison application 130 may determine the annotation range for the annotation. By way of example, if a user has added an annotation for the words "quick brown" in the sample text in paragraph 32 above, the annotation range would be 2-3 for that annotation.

In Step 220, annotation comparison application 130 may compare the original and the modified files to create a comparison output file. The comparison of the main body of data in the files may be performed using any known techniques, and may be performed by a process working in conjunction with annotation comparison application 130. The comparison may result in a comparison output file, also referred to as a redline document. After performing the comparison, annotation comparison application may correlate the word index of the original file with the word index of the modified file because the word indexes of deleted and added words are known. In certain embodiments, annotation comparison application 130 may generate, as a result of the comparison, a matrix that matches each word and its word index in the original file with a word and its word index in the modified file.

In Step 225, annotation comparison application 130 may use the annotation ranges to create matched pairs of annotations from the original file and the modified file. A matched pair of annotations may be two annotations that are associated with the same set of data in the original file and the modified file. The set of data may be, for example, the same words for a paragraph, or the same cell of a spreadsheet, or the same pixels of an image file. As explained below in connection with FIG. 3, matched pairs may be annotations with overlapping annotation ranges. For any matched pairs, annotation comparison application 130 compares the annotation text (Step 230). In certain embodiments, annotation comparison application 130 may copy the annotation text from the original file to a first output file and the annotation text from the modified file to a second output file. In one aspect, computer 100 (or any other computer system or processor) may run a file comparison process to compare the two output files. In other embodiments, annotation comparison application 130 may place the annotation text in a table or matrix and a comparison process may compare the table or matrix. Annotation comparison application 130 may incorporate the results of the comparison of the annotation text into the file comparison output file created in Step 220. In one embodiment, annotation comparison application 130 may accomplish the incorporation of the comparison results into the comparison output file by inserting a hidden character marking the beginning of an annotation before the lowest word index from the two annotation ranges and a hidden character marking the end of an annotation after the highest word index from the two annotation ranges. The annotation identifier of the resulting annotation may point to the location of the result of the annotation comparison, which may show the differences between the two compared annotations in redline. Other manners of incorporating the results into the comparison output file may also be implemented.

In Step 235, annotation comparison application 130 may generate information that allows non-matched annotations from the original file to be shown in the main comparison output file as deleted. In Step 240, annotation comparison application 130 may generate information that allows non-matched annotations from the modified file to be shown in the main comparison output file as inserted. Process 200 may then end, having created information used to show granular comparison of annotations.

Figure 3:
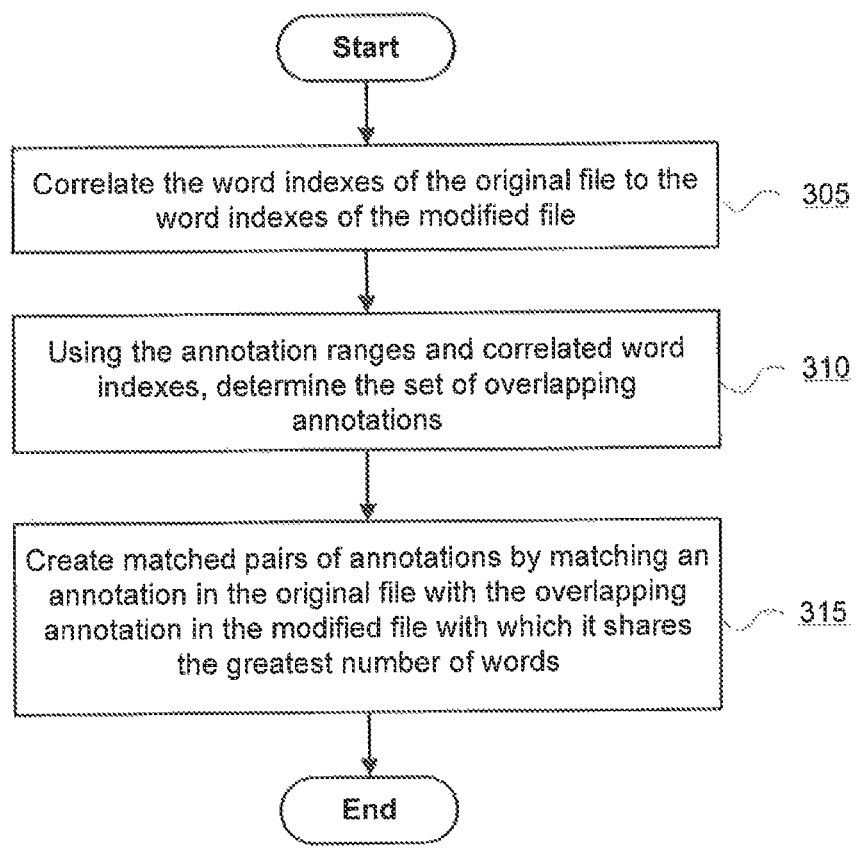
FIG. 3 is a flow diagram illustrating an exemplary annotation matching process, consistent with disclosed embodiments.

FIG. 3 is a flow diagram illustrating an exemplary annotation matching process 300, consistent with disclosed embodiments. In certain embodiments, process 300 may be performed by annotation comparison application 130. Process 300 may be used to determine matching pairs of annotations from the original file and the modified file so that the text of the annotations can be compared, as described in Step 225 of FIG. 2.

In Step 305, annotation comparison application 130 may correlate the word indexes of the original file to the word indexes in the modified file so that the annotation ranges may be compared. In certain embodiments, application comparison application 130 may accomplish this with a matrix that pairs, when possible, words in the original file with words in the modified file, as will be explained in more detail in connection with FIG. 9. In Step 310, annotation comparison application 130 may determine the set of overlapping annotations using the correlated word index and the annotation ranges. Annotations may be considered overlapping when they share at least one common word. Annotation comparison application 130 may use the correlated word indexes to determine which words are in common. Words that are in common may appear in the annotation range of the original file and the annotation range of the modified file. An annotation in the original file may overlap with one or more annotations in the modified file, and vice versa.

In certain embodiments, annotation comparison application 130 may use a weighted bipartite graph process to determine which annotations overlap. The bipartite graph may have two disjointed sets. The first set may be the annotations of the original file and the second set may be the annotations of the modified file. Each annotation may be identified by an annotation identifier. An edge in the graph may connect an annotation in the original file with an annotation in the modified file when the two annotations share at least one word. The edge may be weighted according to the number of words the two annotations have in common.

Figure 4:
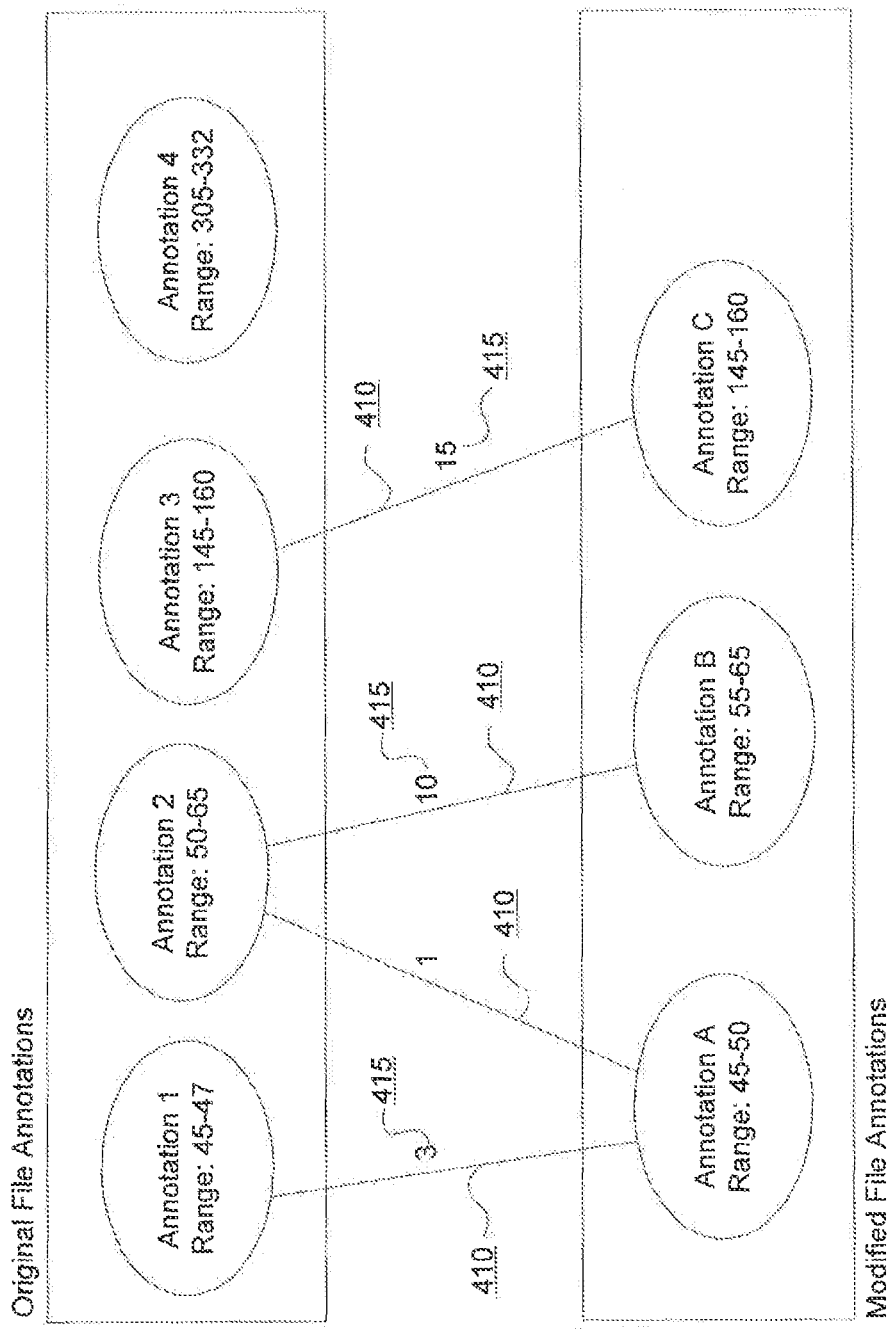
FIG. 4 is an exemplary weighted bipartite graph used to match annotations, consistent with disclosed embodiments.

FIG. 4 is an exemplary weighted bipartite graph used to match annotations, consistent with disclosed embodiments. In the example of FIG. 4, the original file contains four annotations and the modified file contains three annotations. The annotations are arranged as the vertices of graph 400. Edges 410 may connect annotations having overlapping annotation ranges. Each edge 410 may have an associated weight 415. Weight 415 may represent the number of words the two annotations have in common. For example, Annotation 1 has a range of 45-47 and Annotation A has a range of 45-50, Edge 410 connecting these two vertices has a weight (415) of 3 because words 45, 46, and 47 are common to both annotations.

Returning to FIG. 3, in Step 315, annotation comparison application 130 may create matched pairs of annotations by matching an annotation in the original file with the overlapping annotation in the modified file with which it shares the greatest number of common words. In embodiments using a bipartite graph, annotation comparison application 130 may match pairs of annotations using a stable weighted bipartite graph matching algorithm, as is known in the art. Generally speaking, a stable matching occurs when there is no element A of the first matched set that prefers element B (that A is not matched to) of the second matched set, and at the same time B also prefers A over the element B is matched to. In other words, there is no pair that would prefer each other over their currently matched partner. In the example of FIG. 4, the algorithm may result in matching Annotation 1 with Annotation A, Annotation 2 with Annotation B, and Annotation 3 with Annotation C. In this example, Annotation 4 may not have a match in the modified file and therefore may not be part of a matched pair. Annotation 1 may be matched with Annotation A because Annotation A shares three words with Annotation 1, which is greater than the one word it shares with Annotation 2. Likewise, Annotation 2 may be matched with Annotation B because it shares ten words with Annotation B and only one word with Annotation A.

An example of an exemplary annotation comparison process consistent with disclosed embodiments is explained in connection with FIGS. 5 through 10. In this example, a user may select two files for comparison. The first file may contain text 505 and annotation 515, as shown in FIG. 5, although in other embodiments the file may contain other types of data, such as image pixels, rows, columns, etc. Annotation 515 may begin at position 510 and may end at position 517. As shown in FIG. 6, the second file may contain text 605 and annotations 615, 620, and 625. Annotation 615 may begin at position 617 and may end at position 618. Annotation 620 may begin at position 622 and may end at position 623. Annotation 625 may begin at position 627 and end at position 628.

After annotation comparison application 130 receives the first file and the second file, it may create a word index in each file. FIG. 7 demonstrates an exemplary word index for a portion of the first file. As shown in FIG. 7, each word receives a unique representation. In this example, the representations are depicted numerically but other forms of representations may be used. FIG. 8 demonstrates an exemplary word index for a portion of the second file. After creating a word index in each file, annotation comparison application 130 may determine the annotation ranges of annotations 515, 615, 620, and 625. For example, annotation 515 may have an annotation range of 1-26, annotation 615 may have an annotation range of 1-29, and annotation 625 may have an annotation range of 28-28.

Next, annotation comparison application 130 may compare the first file and the second file to identify differences between the two files. The comparison may reveal, for example, that words 3 and 6-8 in the second file have been inserted and word 5 in the first file has been deleted. In certain embodiments, annotation comparison application 130 may generate a matrix, such as matrix 920 shown in FIG. 9, that correlates the word indexes from the first file with the word indexes from the second file. Annotation comparison application 130 may generate a comparison output file that reflects the result of the comparison of the two files, shown as document 1005 in FIG. 10.

Next, annotation comparison application 130 may determine the set of overlapping annotations in the two files. For example, annotation comparison application 130 may determine that annotation 515 overlaps with annotations 615 and 625. As part of this determination, annotation comparison application 130 may determine that the range for annotation 615 of 1-29 correlates to a range of 1-26 in the first file and that annotation 615 has 25 words in common with annotation 515. Annotation comparison application 130 may also determine that the range for annotation 625 of 28-28 correlates to a range of 25-25 in the first file and that annotation 625 has one word in common with annotation 515.

Annotation comparison application 130 may then determine that annotation 515 and annotation 615 are a matched pair because they share more words than annotation 515 and annotation 625, in certain embodiments, this may be accomplished by creating a weighted bipartite graph, as described above in connection with FIG. 4. Next, annotation comparison application 130 may compare the text of annotation 515 and annotation 615, creating an annotation comparison output file that highlights any differences between the text of the two annotations. For any annotations not part of a matched pair, such as annotations 620 and 625, annotation comparison application 130 may create an output showing the annotation text from the first file as deleted and annotation text from the second file as inserted. Annotation comparison application 130 may incorporate the output from the annotation comparison into the comparison output file, which was created when the contents of the first file and the second file were compared.

FIG. 10 depicts an exemplary comparison output file that includes compared annotation text. Annotation 1015, which represents a comparison of annotations 515 and 615 shows that the words "must be" have been deleted and the word "was" has been inserted in annotations 515/615. The text of annotations 1020 and 1025 show as inserted because annotations 620 and 625 had no matching pair in the first file.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in hardware alone. Additionally, although disclosed aspects are described as being stored in a memory on a computer, one skilled in the art will appreciate that these aspects can also be stored on other types of tangible computer-readable media, such as secondary storage devices, like hard disks, floppy disks, a CD-ROM, or other forms of RAM or ROM.

Computer programs based on the written description and disclosed methods are within the capabilities of one of ordinary skill in the art. The various programs or program modules can be created using any of the techniques known to one skilled in the art or can be designed in connection with existing software. For example, program sections or program modules can be designed in or by means of DirectX, .Net Framework, .Net Compact Framework, Visual Basic, C, XML, Java, C++, JavaScript, HTML, HTML/AJAX, or any other now known or later created programming language. One or more of such software sections or modules can be integrated into a computer system or existing browser software.

Other embodiments will be apparent to those skilled in the art from consideration of the specification and practice of the embodiments disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope equivalents.

What is claimed is:

1. A computer-based system for generating comparison output data indicating differences in annotations in electronic files, comprising:
   a memory storing instructions; and
   a processor configured to execute the instructions to:
   identify a first annotation in a first electronic file;
   create a first index for the first annotation, the first index including a plurality of words, pixels, rows, columns, or coordinates in the first electronic file;
   create a second index for a second electronic file different than the first electronic file, the second index including a plurality of words, pixels, rows, columns, or coordinates in the second electronic file;
   compare the first index with the second index to determine whether the second electronic file contains a matching annotation having words, pixels, rows, columns, or coordinates corresponding to the first annotation;
   generate, based on the comparison, a matrix that identifies matches between the words, pixels, rows, columns, or coordinates in the first index of the first annotation and the second index of a second annotation in the second electronic file;
   determine, based on the matrix of the comparison, whether the words, pixels, rows, columns, or coordinates in the first index of the first annotation are present in the second index of the second annotation; and
   create, based on the determination, comparison output data including information for displaying a redline version of characters in the first annotation to indicate changes between the first annotation and the second annotation, wherein the processor inserts into the comparison output data a first hidden character marking a beginning of the redline version and a second hidden character marking an end of the redline version.

2. The computer-based system of claim 1, wherein the processor is further configured to:
   identify first annotation content corresponding to the first annotation;
   identify, when the second electronic file contains a second annotation, second annotation content corresponding to the second annotation;
   calculate a degree of overlap between the first annotation content and second annotation content; and
   determine that the second annotation is a matching annotation when the degree of overlap is above a predetermined threshold.

3. The computer-based system of claim 1, wherein the second electronic file is a modified version of the first electronic file.

4. The computer-based system of claim 3, wherein the comparison output data indication provides that the first annotation was deleted when the second electronic file does not contain a matching annotation.

5. The computer-based system of claim 1, wherein the first electronic file is a modified version of the second electronic file.

6. The computer-based system of claim 5, wherein the comparison output data indication provides that the first annotation was inserted, when the second electronic file does not contain a matching annotation.

7. The computer-based system of claim 1, wherein the indication is provided in redline format.

8. The computer-based system of claim 1, wherein
the first hidden character is associated with a lowest word, pixel, row, column, or coordinate in the first index or the second index, and
the second hidden character is associated with a highest word, pixel, row, column, or coordinate in the first index or the second index.

9. A computer-implemented method for generating comparison output data indicating differences in annotations in electronic files, the method comprising:
identifying a first annotation in a first electronic file;
creating a first index for the first annotation, the first index including a plurality of words, pixels, rows, columns, or coordinates in the first electronic;
creating a second index for a second electronic file different than the first electronic file, the second index including a plurality of words, pixels, rows, columns, or coordinates in the second electronic file;
comparing, by the processor, the first index with the second index to determine whether the second electronic file contains a matching annotation having words, pixels, rows, columns, or coordinates corresponding to the first annotation;
generating, based on the comparison, a matrix that identifies matches between the words, pixels, rows, columns, or coordinates in the first index of the first annotation and the second index of the second annotation;
determining, based on the matrix of the comparison, whether the words, pixels, rows, columns, or coordinates in the first index of the first annotation are present in the second index of a second annotation in the second electronic file; and
creating, by the processor and based on the determination, comparison output data including information for displaying a redline version of characters in the first annotation to indicate changes between the first annotation and the second annotation, wherein the processor inserts into the comparison output data a first hidden character marking a beginning of the redline version and a second hidden character marking an end of the redline version.

10. The computer-implemented method of claim 9, further comprising:
identifying first annotation content corresponding the first annotation;
identifying, when the second electronic file contains a second annotation, second annotation content corresponding the second annotation;
calculating a degree of overlap between the first annotation content and second annotation content; and
determining that the second annotation is a matching annotation when the degree of overlap is above a predetermined threshold.

11. The computer-implemented method of claim 9, wherein the second electronic file is a modified version of the first electronic file.

12. The computer-implemented method of claim 11, wherein the comparison output data indication provides that the first annotation was deleted, when the second electronic file does not contain a matching annotation.

13. The computer-based system of claim 9, wherein the first electronic file is a modified version of the second electronic file.

14. The computer-implemented method of claim 13, wherein the comparison output data indication provides that the first annotation was inserted when the second electronic file does not contain a matching annotation.

15. The computer-implemented method of claim 9, wherein the indication is provided in redline format.

16. The computer-implemented method of claim 9, wherein
the first hidden character is associated with a lowest word, pixel, row, column, or coordinate in the first index or the second index, and
the second hidden character is associated with a highest word, pixel, row, column, or coordinate in the first index or the second index.

17. A computer-based system for generating comparison output data indicating non-matched annotations in electronic files, comprising:
a memory storing instructions; and
a processor configured to execute the instructions to:
receive a first electronic file and a second electronic file different than the first electronic file;
create a first index for a first annotation in the first electronic file, the first index including a plurality of words, pixels, rows, columns, or coordinates in the first electronic file;
create a second index for a second annotation in the second electronic file, the second index including a plurality of words, pixels, rows, columns, or coordinates in the second electronic file;
compare the words, pixels, rows, columns, or coordinates of the first index with the second index to determine whether the first electronic file or the second electronic file contains a non-matched annotation;
generate, based on the comparison, a matrix that identifies matches between the words, pixels, rows, columns, or coordinates in the first index of the first annotation and the second index of a second annotation in the second electronic file;
determine, based on the matrix of the comparison, whether the words, pixels, rows, columns, or coordinates in the first index of the first annotation are present in the second index of the second annotation; and
create, based on the determination, comparison output data including information for displaying a redline version of characters in the first annotation or the second annotation to indicate changes between the first annotation and the second annotation, wherein the processor inserts into the comparison output data a first hidden character marking a beginning of the redline version and a second hidden character marking an end of the redline version.

18. The computer-based system of claim 17, wherein processor is configured to determine whether the first electronic file or the second electronic file contains a non-matched annotation by:
identifying the first annotation in the first electronic file and first annotation content corresponding to the first annotation;
identifying-second annotation content corresponding to the second annotation;
calculating a degree of overlap between the first annotation content and the second annotation content; and
determining that the first annotation is a non-matched annotation when the degree of overlap is below a predetermined threshold.

19. The computer-based system of claim 17, wherein
the first hidden character is associated with a lowest word, pixel, row, column, or coordinate in the first index or the second index, and
the second hidden character is associated with a highest word, pixel, row, column, or coordinate in the first index or the second index.

* * * * *